UNITED STATES PATENT OFFICE.

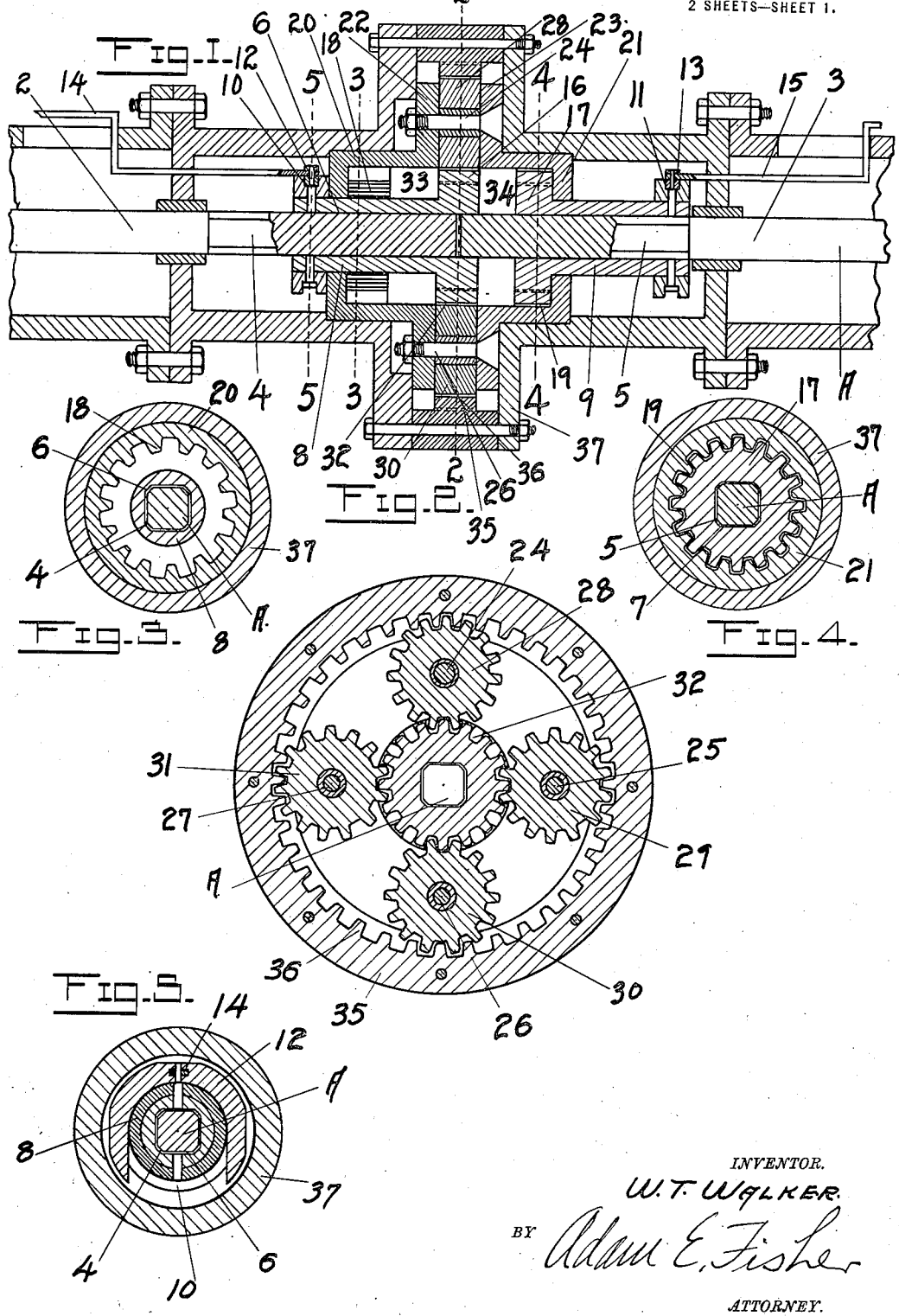

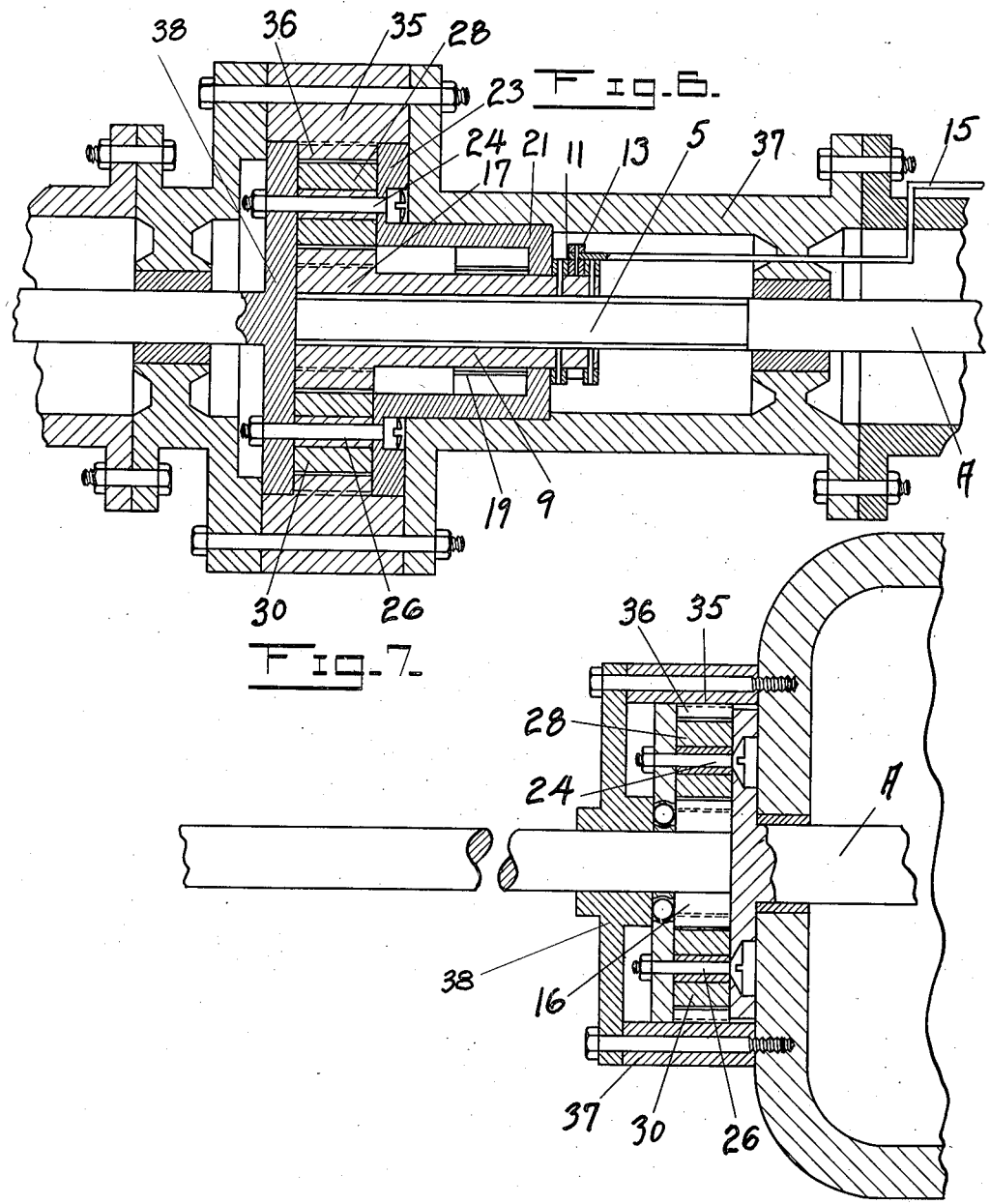

WILLIAM T. WALKER, OF VINITA, OKLAHOMA.

CHANGE-SPEED MECHANISM.

1,342,195.     Specification of Letters Patent.     Patented June 1, 1920.

Application filed July 14, 1919. Serial No. 310,605.

*To all whom it may concern:*

Be it known that I, WILLIAM T. WALKER, a citizen of the United States, residing in the city of Vinita and State of Oklahoma, have invented new and useful Improvements in Change-Speed Mechanisms, of which the following is a specification, reference being had to the accompanying drawings.

The present invention relates to change speed mechanisms for transmitting power at varying speeds from the engine to the point of application. The device may be applied to power shafts of any kind, but it is especially useful on automobiles, trucks, aeroplanes and motor boats.

The primary object is to provide such device in a simple, strong and efficient form for practical use.

A further object is to provide a change speed mechanism affording three variations in the speed rate through a simple and direct gear train.

Another object is to provide a specialized speed transmission device of this type for use upon heavy trucks for carrying a load at low speed to its destination and returning the vehicle at high speed, thus saving much time.

A further object is to provide a similar specialized speed transmission device for use upon aeroplanes, whereby the speed of the propeller may be readily accelerated above the normal speed of the engine.

With these objects in view, attention is called to the drawings, wherein—

Figure 1 is a horizontal sectional view;

Fig. 2 is a transverse section on the line 2—2 in Fig. 1;

Fig. 3 is a transverse section on the line 3—3 in Fig. 1;

Fig. 4 is a transverse section on the line 4—4 in Fig. 1;

Fig. 5 is a transverse section on the line 5—5 in Fig. 1;

Fig. 6 is a sectional view of a modification showing the device adapted for use upon heavy trucks;

Fig. 7 shows a similar modification of the device adapting or specializing it for use upon aeroplanes.

The device is located between the alined sections 2 and 3 of the power transmission shaft A, being in fact employed as a connecting link therefor. For this purpose the ends of these segments are squared as shown at 4 and 5, and thus adapted to pass into and slidingly engage the complementary, squared sockets 6 and 7 of the round shift links 8 and 9. These links 8 and 9 are provided at their ends with annular guide-ways 10 and 11, adapted to freely engage the fingers 12 and 13 of the shift rods 14 and 15. These shift rods may extend to any convenient point to the hand of the operator, and are preferably connected to levers in usual form to facilitate manipulation. Thus the links 8 and 9 may be readily shifted longitudinally upon the ends of the sections of the shaft A. The adjacent ends of the shift links 8 and 9 pass within the sleeves 20 and 21, and carry rigidly mounted pinions 16 and 17 adapted to mesh with the internal clutch teeth 18 and 19 cut at the outer ends of the sleeves 20 and 21. Thus by manipulation of the shift rods 14 and 15, the pinions 16 and 17 may be passed inwardly to the neutral points represented at 33 and 34, and thus out of mesh with the clutch teeth 18 and 19, or they may be drawn outwardly and into mesh with said gears. In the former position the pinions would merely revolve idly within their sleeves, while in the latter position the sleeves would rotate with the pinions. If either pinion or both simultaneously, were shifted to the first mentioned position, the device would be in "neutral" position; if both were shifted to the other position, the sections of the power shaft would rotate together as one, as will be hereinafter explained along with the further elucidation of the device.

The sleeves 20 and 21 carry at their adjacent ends the rigidly joined annular flanges 22 and 23, and between these flanges are rotatively journaled, upon the rigid stub shafts 24, 25, 26, 27, the transmission gears 28, 29, 30, 31, same being equally spaced around between said flanges, and being of such a size and so positioned that the central space 32 intervening at the center of this group of gears will just suffice to receive and cause this group of gears to mesh with either of the pinions 16 or 17 when they are projected or shifted on inwardly, past the neutral points 33 and 34 above referred to. The stub shafts 24, 25, 26, 27 thus also serve to rigidly connect the flanges 22 and 23. An outer gear ring 35 encircles the gears 28, 29, 30, 31 between the flanges 22 and 23, same carrying the internal gear 36 set permanently in mesh with the gears 28, 29, 30, 31. This outer gear ring does not rotate but is anchored in set and immovable position by the housing 37, or other means.

It will now be apparent that with the pinions 16 and 17 both shifted outwardly and into mesh with the clutch teeth 18 and 19, the sections 2 and 3 of the shaft A would be keyed or locked together and would rotate as one shaft, taking their speed direct from the engine. With either or both pinions shifted to their neutral points 33 and 34, of course no power could be transmitted. With the pinion 16 in mesh with the gear 18, and the pinion 17 shifted inwardly into mesh with the gears 28, 29, 30, 31, and assuming the engine to be hitched to the section 2, and same to be rotating clockwise, power would be transmitted at high or accelerated speed. This is explained from the fact that power is then transmitted down to and through the pinion 17 from the four outer gears 28, 29, 30, 31, the latter meshing with and traveling clockwise around the gear 36 in one direction, while at the same time rotating anti-clockwise in another direction, in mesh with the pinion 17, and forcing same to rotate clockwise. Thus the speed of the thrust of the gears 28, 29, 30, 31, upon the pinion 17 is greatly accelerated, likewise increasing the speed of the section 3 of the shaft A. Reversing the position of the pinions, with the pinion 16 in mesh with the gears 28, 29, 30, 31, and pinion 17 in mesh with the gear 19, the speed of the section 2 would be greatly reduced, as the pinion 17 would now be causing the gears 28, 29, 30, 31, both to rotate anti-clockwise and at the same time to travel the gear 36 clockwise, thus retarding the thrust of the gears 28, 29, 30, 31 upon the gear 36, and consequently reducing the speed of the section 2.

It will be noted that I have thus provided a simple, strong and efficient change speed mechanism or device which may be readily applied to any power transmission shaft or drive, and which may be easily manipulated for the purpose of either reducing or increasing the speed of the engine shaft. Likewise, the device may be specialized for use upon heavy trucks for carrying a load at low speed and returning the truck at high speed, thus saving much time. Likewise, the device may be specialized for use upon aeroplanes in order to accelerate the speed of the propeller over the normal speed of the engine shaft. In these two latter instances where only two speeds might be required, as for instance, the normal speed of the engine shaft and then a reduced speed for said heavy trucks; or the normal speed of the engine shaft and then an accelerated speed for said aeroplane, one of the pinions 16 or 17 and one of the shift-links 8 or 9 would be dispensed with, there being only one drive pinion in such special mechanisms, and in such case the end of the shaft section at that side would be permanently joined directly to the sleeve, or to a disk 38.

While I have herein described a certain specific manner and method of constructing and assembling the elements of my invention, it is understood that I may vary from the same in minor details, not departing from the spirit of my invention, so as best to construct a practical device for the purpose intended, as defined in the appended claims.

What I claim to be new and patentable is:

1. A change speed mechanism for power shafts, comprising two shaft sections alined end to end, the adjacent ends of said sections being squared off to interlock with and rotate the mechanism; two round shift links having squared sockets to slidingly engage the squared ends of said shaft sections, said shift-links having each an annular guide-way cut around its outer end; shift fingers slidingly engaging each of said guide-ways of said shift-links to control same; shift rods connected with and extended from said shift fingers, for shifting said shift-links back and forth upon the squared ends of said shaft sections; a pinion rigidly joined to the inner end of each shift link for transmitting power; a sleeve slidingly mounted over each shift-link and pinion, each sleeve having internal clutch teeth cut at its outer end to mesh with its respective pinion, and having a fixed flange at its inner end; four equally spaced stub-shafts rigidly connecting said adjacent flanges of said sleeves; four gears journaled one upon each stub-shaft, same being so proportioned to the pinions at the ends of the shift-links, that the pinions may be shifted into the intervening space between, and in mesh with said gears; a gear ring encircling said set of four gears and having an internal gear cut around its inner periphery adapted to mesh with the four gears; and a housing for the mechanism described, same being anchored to the said gear ring and to a side support to prevent the housing rotating.

2. A change speed mechanism for power shafts, comprising two shaft sections alined end to end, the adjacent ends of said sections being squared off to interlock with and rotate the mechanism; two round shift-links having squared sockets to slidingly engage the squared ends of said shaft sections, said shift-links having each an annular guide-way cut around its outer end; shift fingers slidingly engaging each of said guide-ways of said shift-links to control same; shift rods connected with and extended from said shift fingers, for shifting said shift-links back and forth upon the squared ends of said shaft sections; a pinion rigidly joined to the inner end of each shift-link for transmitting power; a gear set mounted between said pinions, adapted to receive either alternately in mesh, in order to accelerate or reduce the relative speed of the shaft sections as one or the other pinion is engaged, and adapted to release both pinions into neutral position; means for transmitting rotative motion directly between said pinions when same are not in mesh with said gear set; and an anchored housing for the described mechanism.

3. A change speed mechanism for power shafts, comprising two alined shaft sections; a gear set mounted between said sections, same including sleeves mounted over the adjacent ends of the sections, stub shafts connecting the ends of said sleeves around the peripheries thereof, gear wheels radially journaled upon said stub-shafts, a gear ring with an internal gear mounted over said gear wheels and in mesh therewith, a pinion mounted within each said sleeve and adapted to interlock therewith or alternately to pass through neutral positions into mesh with said gear wheels at their common center, a shift-link rigidly attached to each said pinion and extended outwardly into sliding engagement with the ends of said shaft sections; means for manipulating said shift-links; and a housing anchored to a side support and to said gear ring to prevent the latter rotating.

4. A change speed mechanism for power shafts, comprising an anchored housing; a gear ring with an internal gear medially, transversely, perpendicularly and rigidly mounted within the housing; two alined sleeves brought together at the center of and perpendicularly to said gear ring; annular flanges extended laterally from the adjacent ends of the sleeves; a plurality of independent, spaced gear wheels mounted around and between said flanges, in mesh with said gear ring, and so as to leave a central space between the gears to receive a shift pinion; two sections of power shaft rotatively mounted in alinement in the sleeves, one section on each side of said gear ring; two shift pinions mounted within the sleeves for longitudinally sliding engagement, one with each inner end of said shaft sections, and each adapted to shift into said central space between and in mesh with said gear wheels, and adapted also to shift outwardly first into a neutral zone, and thence into locking engagement with its inclosing sleeve; and means for facilitating the shifting of said pinions.

WILLIAM T. WALKER.

Witnesses:
  A. K. Dohle,
  A. M. Dowd.